B. G. ERLER AND E. ROESLER.
RESILIENT TIRE.
APPLICATION FILED SEPT. 19, 1919.
1,356,438.
Patented Oct. 19, 1920.
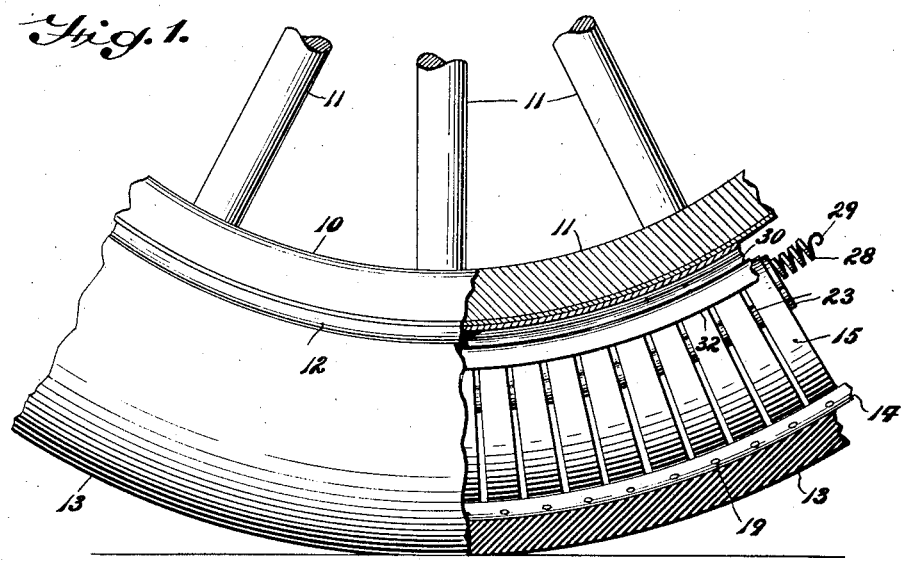
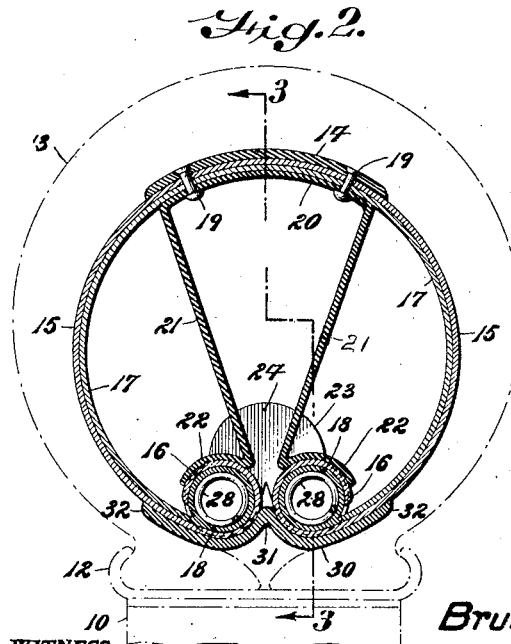
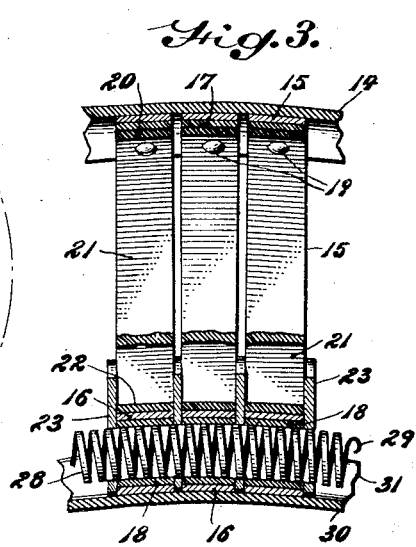
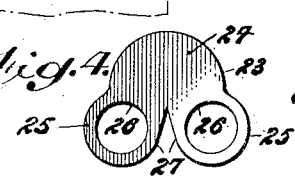
Bruno G. Erler and Emil Roesler
INVENTORS.
BY
Victor J. Evans
ATTORNEY.

UNITED STATES PATENT OFFICE.

BRUNO G. ERLER AND EMIL ROESLER, OF PHILADELPHIA, PENNSYLVANIA.

RESILIENT TIRE.

1,356,438.　　　　Specification of Letters Patent.　　Patented Oct. 19, 1920.

Application filed September 19, 1919. Serial No. 324,771.

*To all whom it may concern:*

Be it known that we, BRUNO G. ERLER and EMIL ROESLER, citizens of the United States and the Republic of France, respectively, residing at Philadelphia, in the county of Philadelphia and State of Pennsylvania, have invented new and useful Improvements in Resilient Tires, of which the following is a specification.

This invention relates to tires and it has more particular reference to that form or type of tire which is generally designated a resilient tire.

The main object of our invention is to provide a tire having substantially the same resiliency as a pneumatic tire but requiring no inflation nor the use of compressed air to maintain the tire in expanded condition.

Another object of our invention is to provide what may be termed a resilient inner tube structure adapted for substitution in the place of the customary air or inner tube of pneumatic tires.

A further object of our invention is to provide a tire which will be entirely free from puncture, blowout, leakage and the many other troublesome contingencies incident to the ordinary types of pneumatic tires.

With the foregoing enumerated principal objects, and others which will be more apparent as the description proceeds, this invention consists essentially of an inner structure for tires of the type referred to which is made entirely of more or less springy material the various parts whereof are so assembled and flexed as to insure the proper distention of the outer covering or tread in all directions.

In the further disclosure of the invention reference is to be had to the accompanying sheet of explanatory drawings constituting a part of this specification, in which like characters of reference designate the same or similar parts in all the views.

Figure 1— is a fragmentary side view— partly in section—of a tire and the wheel rim thereof embodying our present improvements.

Fig. 2— is a transverse section of the same drawn to an enlarged scale the dot-and-dash lines indicating the outer covering.

Fig. 3— is a longitudinal section taken on the line 3—3 in Fig. 2 and looking in the direction of the arrows thereon: and;—

Fig. 4— is a view of one of the washer or spacing elements hereinafter more particularly referred to.

Referring to the drawings, the numeral 10 designates a part of an automobile wheel felly, 11 the spokes thereof, 12 the demountable rim, and 13 the outer cover thereof, all of said parts being in accordance with accepted constructions and forming no part of our invention.

Our improved inner tube substitute comprises an outer annular ring 14, of sheet steel which may be made segmental in cross section—as shown—or it may be of any other desired section to accommodate different types of outer covers. Radially disposed relative to this outer annular ring 14, and fitting snugly thereto are a series of arched or C-shaped flat thin steel springs 15, the inner ends whereof are turned over to constitute substantially closed eyes 16, and fitting snugly within these steel springs 15, are similarly fashioned thin flat steel springs 17, the inner ends whereof are turned over and welded or otherwise secured to form eyes 18, and it will be clearly seen on reference more particularly to Fig. 2, that the eyes or turned over parts 16, of the outer springs 15 fit snugly on and grip the eyes 18. Furthermore it is to be noted that the springs 15, 17, conform throughout when the parts are assembled to the curvature of the inner wall of the outer casing or cover 13.

Seated within and securely attached to each individual set of springs 15, 17 and to the outer annular ring 14, as by rivets 19, is an inner supporting spring 20, formed with inwardly converging limbs 21, the free ends whereof are curved at 22, to seat snugly on the afore-mentioned eyes 16, and thereby hold the springs 15, 17, in proper position to conform to the inner wall of the outer casing or cover 13.

Positioned between the ends of each two sets of springs 15—17 and 20 is a spacing element or washer 23, of the pattern shown clearly by Fig. 4, that is to say it includes an outer curved part 24, and lateral wing portions 25, having holes 26 therethrough of a diameter equal to the diameter of the eyes 18, and a bifurcation or wedge-shaped cutout portion 27 for the purpose hereafter explained.

Threaded through the registering holes in the eyes 18, and the holes 26, in the spacing elements or washers 23, are continuous contractile springs 28, the ends whereof are hooked at 29, and when the parts are assembled said ends 29 are hooked together by any appropriate means, and it will thus be readily seen that these springs 28 serve as locking means for maintaining the inner ends of the radially disposed springs 15, 17, in proper relation as well as insuring proper distribution of the requisite resiliency evenly all around the complete tire.

In order to provide a seating element for the inner tube construction above set forth we preferably employ an inner annular ring 30, which is formed with a central and outwardly projecting peripheral bead or projection 31, which when the parts are assembled seats in the aforementioned bifurcation or cut-out portion 27, of the spacing elements or washers 23, as well as between the eyes 16. For ordinary pneumatic tires this annular ring 30 is fashioned with lateral and outwardly curved flanges 32, on each side of the central bead 31 so that said ring seats more snugly to the inner beaded edges of the outer cover 13 as shown clearly in Fig. 2.

From the foregoing description, taken in conjunction with the accompanying drawings, it will be understood that the outer annular ring 14, and transverse or arched springs 15, 17 are supported in expanded condition by means of the inner springs 20 having converging members 21, the latter in turn by their curved parts 22, seating on the eyes 16, 18 and tending to always keep the same in proper spaced relation centrally of the tire. On the other hand the contractile springs 28, and spacing elements or washers 23, make provision for the necessary bending of the springs 15, 17 for the compression of the tire at the point of impact.

Furthermore by the particular manner and method of assembling the several parts constituting our improved inner tube construction considerable latitude is provided for in the flexure of the springs 15, 17, and 20 to accommodate the flexure of the outer casing or cover 13 when subjected to varying loads or excessive shocks. Still further it is to be observed that by the employment of the outer and inner annular rings 14, 30 of suitable width provision is made for preventing the abrading, chafing or otherwise injuring the inner face of the tire casing or cover 13 due to creeping and the like.

Finally it will be readily seen that a tire provided with an inner tube structure made entirely of spring steel and assembled as set forth will be cheap to construct and expeditiously set in place, and while we have described one practical embodiment of our invention we wish it clearly understood that changes may be made in the various parts as well as other arrangements and combinations effected without in any way departing from the spirit and scope thereof and as more specifically defined by the appended claims.

Having described our invention, what we claim as new and desire to secure by Letters Patent is:—

1. In a resilient tire the combination with an outer covering, of an inner supporting structure comprising an outer annular band, inwardly and radially projecting arched springs and inwardly converging supporting springs carried by said outer annular band, means flexibly connecting the inner ends of the arched springs, and an inner annular ring for maintaining the inner ends of the springs in spaced relation.

2. In a resilient tire the combination with an outer covering, of an inner supporting structure comprising an outer annular band, leafed inwardly and radially projecting arched springs and inwardly converging supporting springs secured to said outer annular band, spacing elements between the inner ends of the arched and supporting springs, means flexibly connecting the ends of the arched springs and the spacing elements, and an inner annular ring for maintaining the inner ends of the springs in spaced relation.

3. In a resilient tire the combination with an outer covering, of an inner supporting structure comprising an outer annular band concavo-convex in cross section, leafed inwardly and radially projecting arched springs having eyed ends, inwardly converging supporting springs the free ends whereof seat on the eyed ends, said arched springs and supporting springs being secured to the outer annular band, spacing elements between the inner ends of the arched and supporting springs, contractile means threaded through the eyed ends of the arched springs and spacing elements, and an inner annular ring for maintaining the inner ends of the springs in spaced relation.

4. In a resilient tire the combination with an outer covering, of an inner supporting structure comprising an outer annular band concavo-convex in cross section, leafed inwardly and radially projecting arched springs having eyed ends, inwardly converging supporting springs the free ends whereof are curved to seat on the eyed ends, said arched springs and supporting springs being secured to the outer annular band, apertured spacing elements having a cut-out portion on their inner edges disposed between the inner ends of the arched and supporting springs, contractile springs threaded continuously through the eyed ends of the arched springs and the apertures of the spacing elements, and an inner annular centrally beaded ring for maintaining the inner ends of the springs in spaced relation.

5. In a resilient tire the combination with an outer covering, of an inner supporting structure comprising an outer annular band concavo-convex in cross section, leafed inwardly and radially projecting arched springs having eyed ends, inwardly converging supporting springs the free ends whereof are curved to seat on the eyed ends, said arched springs and supporting springs being secured to the outer annular band, apertured spacing elements having a cut-out portion on their inner edges disposed between the inner ends of the arched and supporting springs, contractile springs threaded continuously through the eyed ends of the arched springs and the apertures of the spacing elements, and an inner annular centrally beaded ring substantially concavo-convex in cross section said centrally beaded part being adapted to seat in the cut away parts of the spacing elements and the concavo-convex portion to fit snugly thereunder.

6. In a resilient tire the combination with an outer covering, of an inner supporting structure comprising an outer annular continuous band concavo-convex in cross section, flat leafed inwardly and radially projecting substantially circular springs having terminal eyed ends, inwardly converging flat supporting springs the terminal portions whereof are arched to seat upon the aforesaid terminal eyed ends, said circular and supporting springs being secured to the inner face of the outer annular band in spaced relation, apertured spacing elements having a medial cut out portion on their inner edges disposed between the terminal ends of the circular and supporting springs, contractile springs threaded continuously through the eyed terminal ends of the circular springs and the apertures of the spacing elements, and an inner annular centrally beaded ring substantially concavo-convex in cross section said centrally beaded part being adapted to seat in the cutaway parts of the spacing elements and the concavo-convex portion to fit snugly to the terminal ends of the circular springs as well as under the spacing elements.

In testimony whereof we affix our signatures.

BRUNO G. ERLER.
EMIL ROESLER.